Aug. 6, 1935.    F. M. BARTELME    2,010,288
TRANSMISSION MECHANISM FOR MOTOR VEHICLES
Filed June 11, 1931    3 Sheets-Sheet 1

INVENTOR.
Ferdinand M. Bartelme.
BY
Jesse R. Langley
ATTORNEY.

Aug. 6, 1935.   F. M. BARTELME   2,010,288
TRANSMISSION MECHANISM FOR MOTOR VEHICLES
Filed June 11, 1931   3 Sheets-Sheet 2

INVENTOR.
Ferdinand M. Bartelme
BY
Jesse R. Langley
ATTORNEY.

Aug. 6, 1935.   F. M. BARTELME   2,010,288
TRANSMISSION MECHANISM FOR MOTOR VEHICLES
Filed June 11, 1931   3 Sheets-Sheet 3
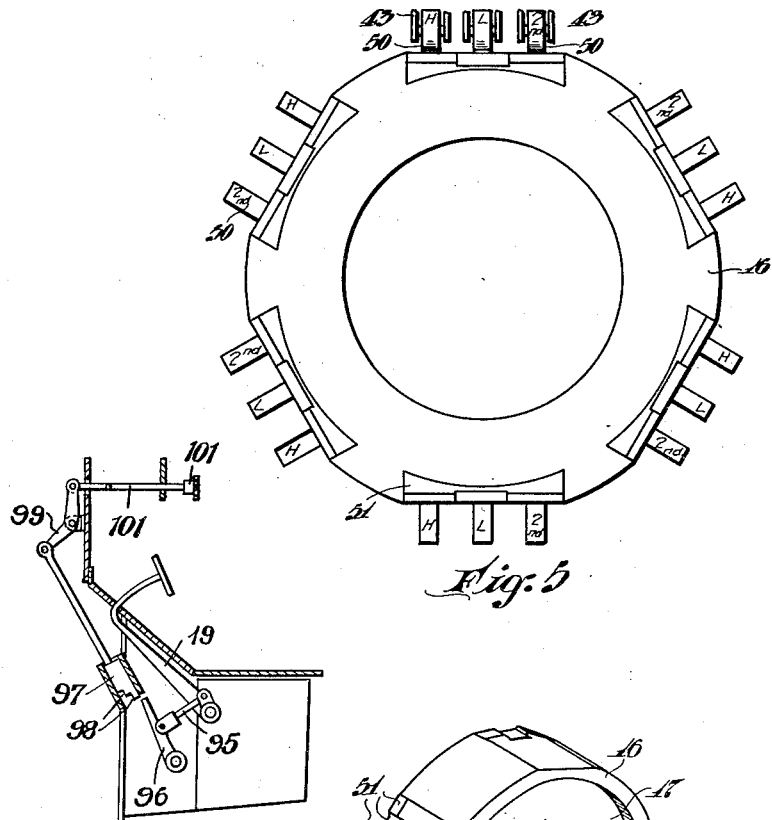
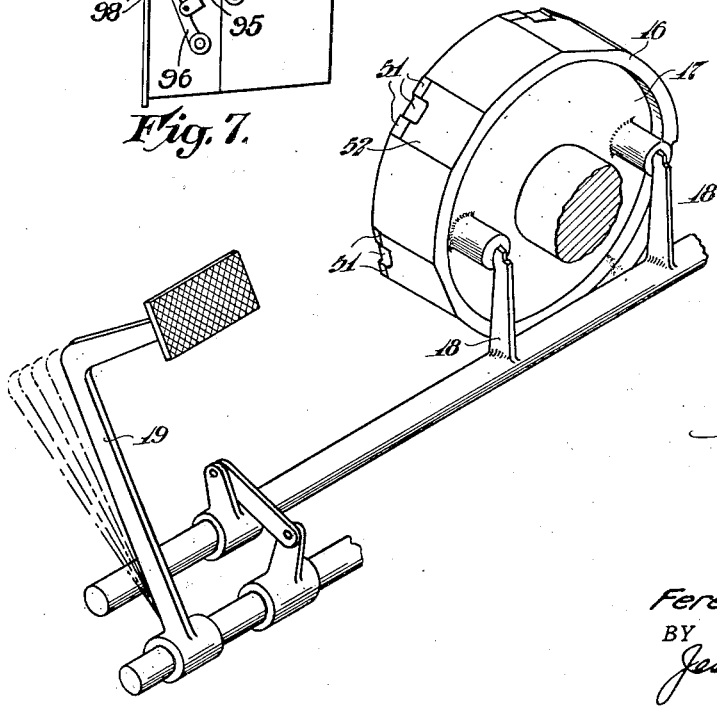
INVENTOR.
Ferdinand M. Bartelme.
BY Jesse Q. Langley
ATTORNEY.

Patented Aug. 6, 1935

2,010,288

UNITED STATES PATENT OFFICE 2,010,288

TRANSMISSION MECHANISM FOR MOTOR VEHICLES

Ferdinand M. Bartelme, Glencoe, Ill.

Application June 11, 1931, Serial No. 543,607

4 Claims. (Cl. 192—48)

My invention relates to transmission mechanisms for motor vehicles and particularly to such mechanisms as control the speed ratio between the engine and the vehicle.

One object of my invention is to provide a transmission mechanism having a plurality of forward speeds that may be selectively controlled in accordance with the movement of a single member in one direction.

A further object of my invention is to provide a transmission mechanism by means of which speed ratios may be changed without changing the speed of the engine and without jar or shock to the vehicle.

A still further object of my invention is to provide a clutch mechanism the operative and successive connection of the parts of which may be controlled by a manually operable member.

Transmission mechanisms as most commonly employed in motor vehicles comprises a plurality of sets of gears, one member of each set being arranged to be actuated into and out of mesh with other gear wheels in accordance with the speed ratio that is desired. The changing of gears by means of such mechanisms has always been somewhat unsatisfactory by reason of the difficulty in securing substantially equal peripheral speeds of the gears to be placed in mesh.

The unsatisfactory conditions of the usual change speed gear mechanism are obviated in the transmission mechanism of my invention. In its operation, it is not necessary to shift gears into and out of mesh and, accordingly, all clashing of gears and other disagreeable features of the usual transmission mechanism are avoided.

The transmission mechanism of my invention comprises, in general, a series of friction discs that are connected to a transmission mechanism for operation at different speed ratios. The operative connections of these discs to the friction elements that are driven by the engine are controlled by the usual clutch pedal.

The several friction discs are connected to the driven portion of the propeller shaft at different speed ratios by means of gears and one-way clutches. The clutch pedal operates according to its position to selectively determine the speed ratio by connecting clutch discs and friction elements in accordance with that position.

Briefly, the clutch pedal, when in its extreme forward position, disconnects all of the clutch discs and friction elements and the mechanism is in its neutral position. When the clutch pedal is permitted to return to its rearward position, it successively connects an increasing number of clutch discs with their coacting friction elements to secure low gear, second gear and high gear in order.

When the clutch pedal is moved forwardly from its rearmost or high gear position, the several speed ratios are secured in the order inverse to that stated above.

The details of my invention will be described in connection with the accompanying drawings, in which Figure 1 is a view in longitudinal cross-section of a transmission mechanism constructed in accordance with my invention, together with certain of its associated parts;

Fig. 5 is a front elevational view of a cam member for controlling the clutch disc levers, the positions of the various levers being indicated diagrammatically;

Fig. 6 is an enlarged view illustrating the connection of the clutch pedal to the means for controlling cam member of Fig. 5;

Fig. 7 is a vertical sectional view of a portion of the body of the vehicle with a manually-operated controlling or locking mechanism connected thereto.

Figure 1:
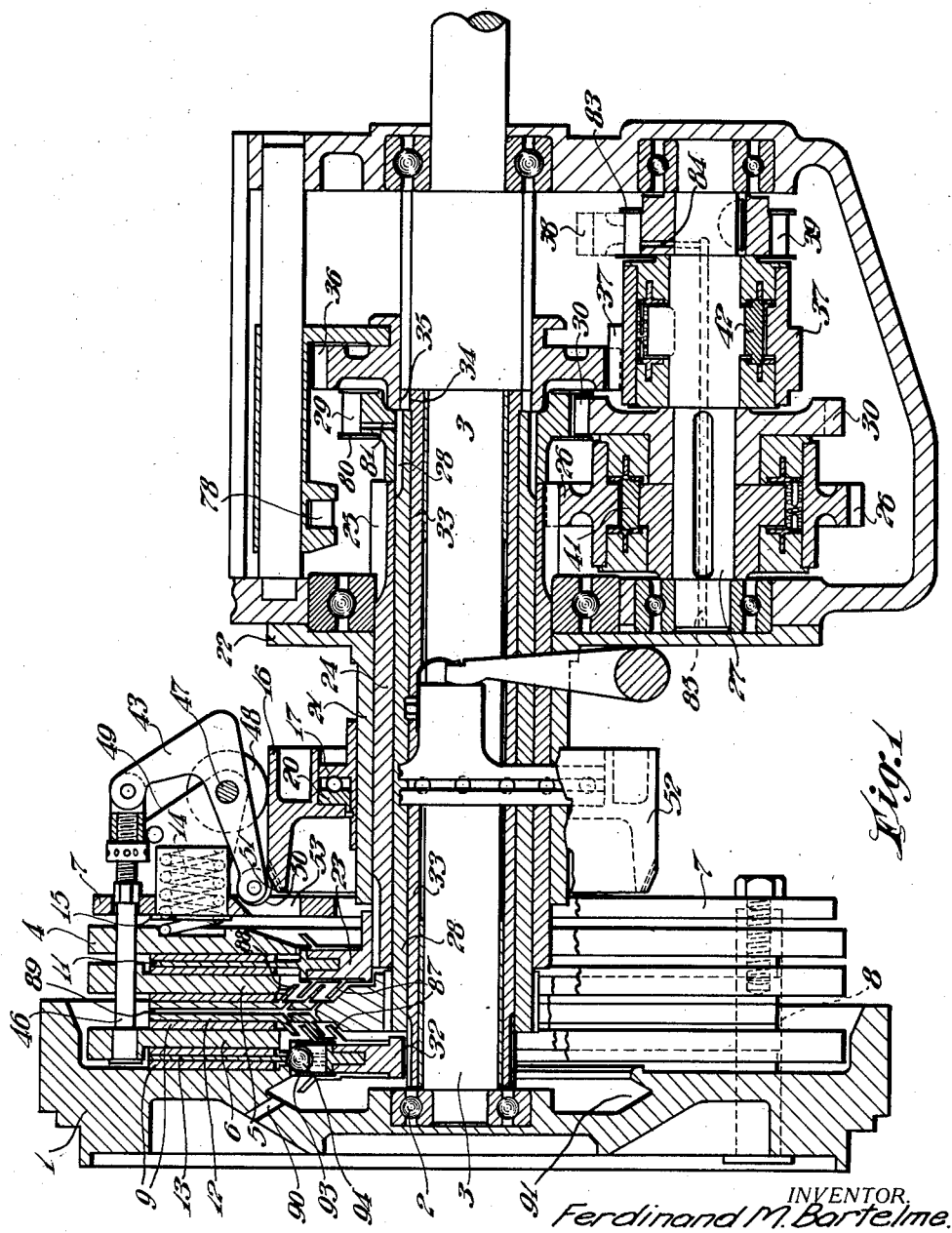

Referring particularly to Fig. 1, the transmission mechanism of my invention comprises a fly wheel I that is adapted to be secured on its front or left face to the usual engine shaft for rotation therewith. A ball bearing 2 mounted in the fly wheel supports the forward end of a propeller shaft 3.

A clutch mechanism that co-operates with the fly wheel I comprises a series of annular plates 4, 5 and 6 that are connected between the fly wheel I and an annular plate 7 by means of bolts 8 for rotation with the fly wheel. The plates 4, 5 and 6 are axially movable on the bolts 8, only one of which appears in Fig. 1.

Friction material 9 forms opposite faces for each of clutch discs II, 12 and 13. These clutch discs alternate with the fly wheel I and the plates 4, 5 and 6 and are connected to the driven portion of the transmission mechanism, as will be described. The plates 4, 5 and 6 and the discs II, 12 and 13 are normally pressed toward the fly wheel I and into mutual engagement by means of springs 14 in cups 15 that are spaced at intervals around the plate 7.

The axial positions of the several clutch plates and their engagement with the coacting discs are selectively controlled by means of an approximately hexagonal collar or cam 16 rotatable with the fly wheel and clutch plates. The cam 16 is connected to the several plates 4, 5 and 6 by a system of levers to be later described in detail.

The axial position of the cam 16 is governed by a flanged sleeve 17 controlled by a yoke 18 connected to the usual clutch pedal 19 (Fig. 6). The sleeve 17, which does not rotate, has a ball-bearing connection 20 to the cam 16 and is slidable upon a concentric sleeve 21 that is secured to a transmission housing 22.

The clutch disc 11, which is the low gear disc, has a hub 23 that is slidably splined on the forward end of a rotatable sleeve 24. The other end of the sleeve 24 is provided with a gear 25 which meshes with a gear 26 on a countershaft 27. The clutch disc 12, the second gear disc, is similarly splined on one end of a sleeve 28 that is provided at its other end with a gear 29 meshing with a gear 30 on the countershaft 27.

The high gear clutch disc 13 is provided with a hub 32 that is splined on an inner sleeve 33 rotatably mounted on the propeller shaft 3. The right-hand end of the sleeve 33 has a clutch member 34 meshing with an internal clutch member 35 that is integral with a larger gear 36.

The gear 36 meshes normally with a gear 37 on the countershaft 27 but is slidable along on the propeller shaft 3 out of mesh with the gear 37 and into mesh with an idler gear 38 for driving in reverse. The gear 38 meshes with a gear 39 on the countershaft 27.

The gears 30 and 39 are directly secured to the countershaft 27 but the gears 26 and 37 are connected to the countershaft 27 by means of one-way or overrunning clutches 41 and 42 (of conventional design) that are similar in construction except that the shaft 27 is adapted to overrun the gear 26 while the gear 37 is adapted to overrun the shaft 27.

Reference may now be had to Figs. 2 to 6, in which are illustrated certain of the details of the means for controlling the axial positions of the several clutch plates 4, 5 and 6. The lever mechanism controlled by the cam 16 comprises six sets of bell-crank levers 43, each set comprising three levers that are adjustably connected to the several plates 4, 5 and 6 by pull-bolts 44, 45 and 46, respectively. Only one set of levers is illustrated, the other sets being identical therewith.

The levers 43 of each set have a common pivotal support on a pin 47 on which are also mounted two rollers 48 which roll upon the outer surface of the cam 16, as shown in Fig. 1. The pin 47 is supported at its ends by the two triangular plates 49 secured at right angles to the plate 7. Each lever 43 is provided at its lower end with a small roller 50 which coacts with the corresponding cam surface 51 on the forward edge of one of the six projections 52 of the cam 16, as shown in Figs. 1 and 5.

The several cam surfaces 51 are of such different depths and the levers 43 are so adjustably connected to their respective pull-bolts that the forward actuation of the cam 16 first causes the pull-bolts 46 to simultaneously actuate all of the plates 4, 5 and 6 rearwardly to release the high-gear disc 13. Next the plates 4 and 5 are actuated farther rearwardly by the pull-bolts 45 while the plate 6 remains stationary to release the second-gear disc 12. The completion of the forward movement of the cam 16 causes pull-bolts 44 to actuate only the plate 4 rearwardly to release the low-gear disc 11.

During the forward movement of the cam 16, the six projections 52 extend through corresponding openings 53 in the plate 7.

Figure 2:
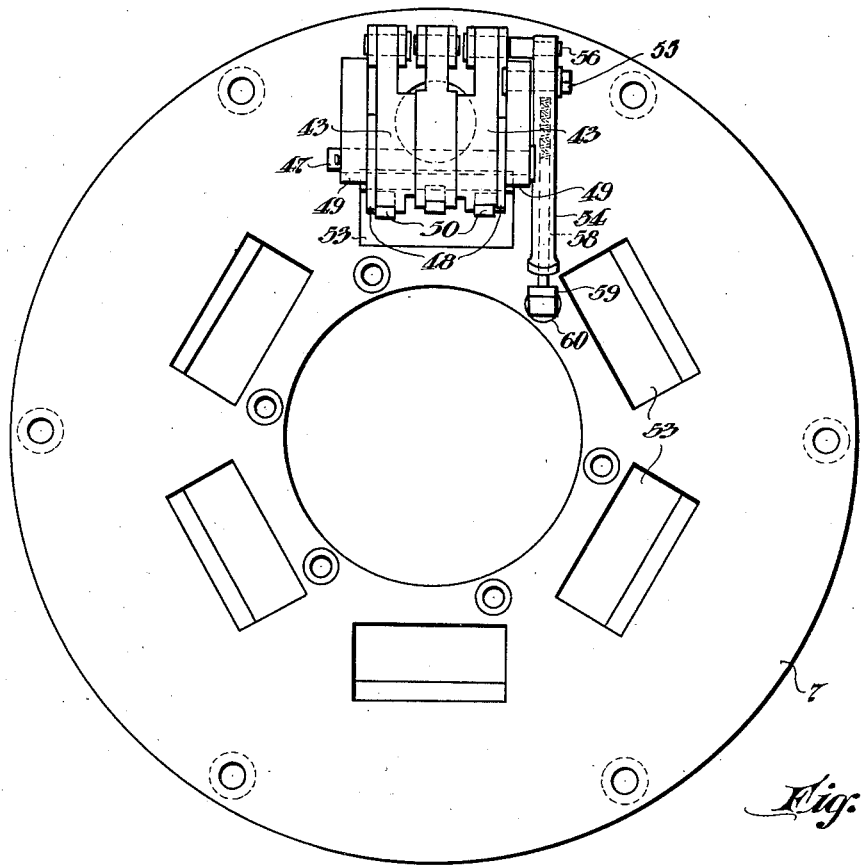
Fig. 2 is a rear elevational view of an annular plate member connected to the fly wheel and certain of the cam-controlled levers, the remainder being omitted for the sake of clearness.

Each set of levers 43 is provided with an accentuating device or poppet lock 54, which acts as a position indicator. The poppet lock 54 has the form of a finger that is pivotally mounted at 55 on one of the plates 49, as shown in Figs. 1 and 2. A pin 56, connected to an outer pull-bolt of each set, extends through a fork 57 at the top of the corresponding finger 54. When the pin 56 and the connected lever are moved by the cam 16, the finger 54 is rocked about its pivot 55 to assume one of the several positions shown in Fig. 3.

Figures 3, 4:
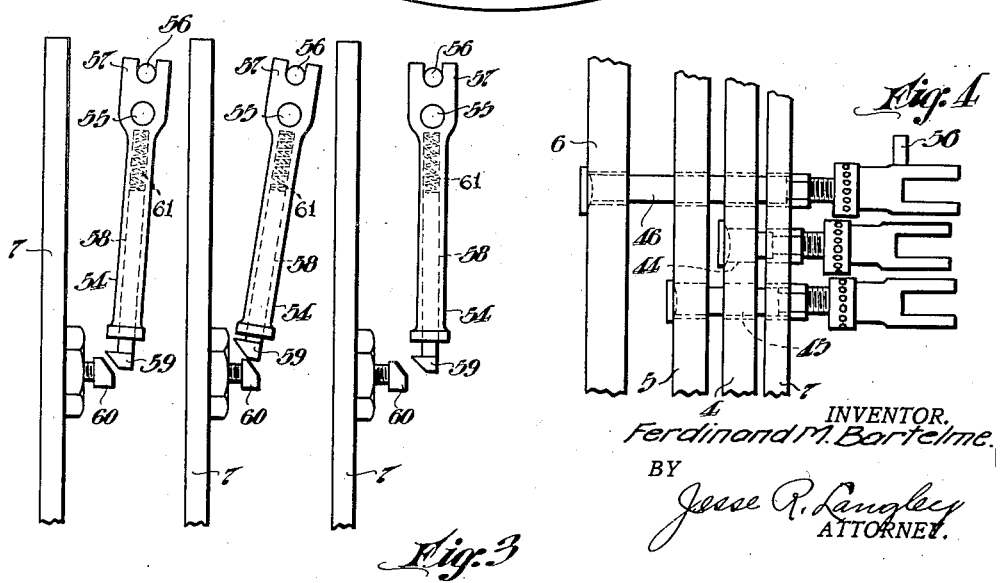
Fig. 3 is a view in side elevation illustrating the successive positions of accentuating or indicating devices.
Fig. 4 is a fragmentary enlarged top plan view of one set of levers and the pull bolts for connecting them to the respective clutch discs.

Three of the fingers 54 are connected to pull-bolts 46 which control the engagement of the high-gear clutch disc 13 and the other three are connected to pull-bolts 45 (see Fig. 4) which control the second-gear clutch disc 12. The normal and operative positions of the fingers 54 are shown in Fig. 3.

The finger on the left is in the normal position of the three fingers operatively connected to the high-speed levers 43. The center finger 54 is in the position they have assumed after the pull-bolts 46 have operated to disengage the high-gear clutch disc 13. A plunger 58, having a cam head 59, has engaged a cam 60 on the plate 7 to compress a spring 61 within the finger 54. The resistance of these fingers indicates second gear.

The further movement of the cam 16 does not affect the devices 54 referred to above. But the three fingers connected to the second gear levers, and which normally occupy positions corresponding to that illustrated on the right, now occupy positions corresponding to that shown on the left when the mechanism is in second gear. When the second gear levers operate to release the disc 12, the latter three fingers assume positions corresponding to that of the center finger and these fingers, by their resistance, indicate low gear. None of these fingers are affected by the further movement of the cam 16 to neutral position.

As shown partially diagrammatically in Fig. 5, the levers 43 are arranged symmetrically with respect to the cam 16 in order that the forces required to operate the several levers successively will be balanced. As indicated by the characters H, 2 and L, signifying high gear, second gear and low gear levers 43, respectively, the order of these are reversed in certain of the sets to arrange the latter in pairs. Accordingly, there is no tendency to turn the cam 16 from its proper angular position relative to the fly wheel 1 and its connected clutch mechanism, all of which rotate in unison.

The operation of the transmission mechanism will now be described. It may be assumed that the vehicle is stationary and that the engine and the fly wheel 1 connected thereto are rotating. The several clutches are in the positions in which they are illustrated in Fig. 1, but the gear 36 is in a position sufficiently to the right of that illustrated in Fig. 1, that the clutch members 34 and 35 are disconnected. In this arrangement, there is no operative connection between the engine and the propeller shaft 3.

To operate the vehicle, the clutch pedal 19 is actuated to its extreme forward position to release the clutch discs 11, 12 and 13 by means of the yoke 18, cam 16, levers 43 and their several attached pull-bolts 44, 45 and 46. The gear 36 is then actuated by means of a lever 78 to the position shown in Fig. 1, in which the clutch member 34 meshes with the internal clutch member 35.

The clutch pedal 19 is then permitted to return toward its normal position to the point at which the clutch disc 11 is engaged by the plates 4 and 5 to establish a driving connection between the engine and the propeller shaft for low-gear operation. The low-gear connections are as follows: The engine-driven fly wheel 1 operates through the clutch plates 4 and 5, clutch disc 11, sleeve 24, gears 25 and 26, one-way clutch 41, countershaft 27, one-way clutch 42 and gears 37 and 36 to drive the propeller shaft 3. The latter is connected through the usual differential gearing to the rear wheels of the vehicle.

During the operation at low-speed ratio, or low gear, as described above, the clutch discs 12 and 13 rotate at speeds that are different from that of the fly wheel and the clutch mechanism secured thereto because of their operative connections to the countershaft 27 and to the shaft 3, respectively.

When it is desired to operate at second gear, the clutch pedal 19 is permitted to return to its next position, in which the connected mechanism permits the plates 5 and 6 to engage clutch disc 12 to establish a driving connection as follows: The fly wheel 1 drives clutch disc 12, sleeve 28, gears 29 and 30, countershaft 27, one-way clutch 42, gears 37 and 36 and the propeller shaft 3.

During the operation in second gear, the countershaft 27 overruns the gear 26 through the one-way clutch 41. The clutch discs 11 and 12 now turn at the same speed because both are clamped between the plates 4, 5 and 6. The clutch disc 13 rotates with the propeller shaft 3 by reason of its direct connection thereto.

When the clutch pedal is released to its third operative position, the train of mechanism connected thereto has permitted the springs 14 to shift all of the clutch plates 4, 5 and 6 to the left to cause the clutch disc 13 to be engaged by the plate 6 and the fly wheel 1. The vehicle now operates in high gear and the driving connections are direct as follows: The fly wheel 1 drives clutch disc 13, sleeve 33, clutch members 34 and 35 and the propeller shaft 3.

During high-gear operation, the clutch discs 11, 12 and 13 operate at fly-wheel speed because they are all engaged by the clutch plates and the fly wheel. Gears 29 and 30 drive countershaft 27, which overruns gear 26 through one-way clutch 41. Gear 37 overruns the countershaft 27 by means of one-way clutch 42.

When the vehicle is operating in high gear, the clutch pedal is in its extreme rearward position and no pressure need be maintained upon it as the usual springs 14 retain it in that position. Also, the several springs 14 retain the clutch plates 4, 5 and 6 and the pull-bolts and levers 43 connected thereto in their positions for high-gear operation.

The mechanism may be shifted to any other gear ratio simply by actuating the clutch pedal to the corresponding position as indicated to the driver by the poppet locks or indicating devices 54. This movement releases the clutches to secure the desired speed ratio. When the clutch pedal is depressed to its foremost position, all of the clutches are disengaged and the fly wheel 1 is disconnected entirely from the propeller shaft.

High gear may be eliminated whenever desired by operating the lever 78 to shift the gear 36 to the right to move the internal clutch member 35 out of mesh with the clutch member 34. If the gear 36 remains in mesh with the gear 37, low gear and second gear will be obtained in the manner described above but the clutch disc 13 and sleeve 33 now have no driving connection to the propeller shaft. When the clutch pedal is in the normal position for high gear, the mechanism is in second gear because all of the clutch discs are engaged by the clutch plates, but the disc 13 is disconnected.

To operate the mechanism in reverse, the gear 36 is shifted to the right out of mesh with the gear 37 and into mesh with the idler gear 38. The countershaft 27, which may be driven by the connections described above for low gear and second gear, is thus connected to the propeller shaft 3 by gears 39, 38 and 36 for rotation of the shaft 3 in reverse direction.

The transmission mechanism is provided with a system of forced lubrication in which meshing gears 29 and 30 are used as gear pumps to force oil to various bearing surfaces to which access might otherwise be somewhat uncertain although the mechanism within the transmission casing 22 operates in oil. The gear 29 is provided with shrouds 80 which close the ends of certain of the tooth spaces. Holes 81 leading from these enclosed tooth spaces convey oil forced therethrough when teeth of the gear 30 enter these spaces.

Oil from the holes 81 lubricates the space between sleeves 28 and 33, suitable pockets or grooves being provided which communicate through suitable holes to similar pockets between sleeves 25 and 28 and between sleeve 33 and shaft 3. The oil is returned by means of a groove on the outer diameter of the sleeve 28 to the interior of the transmission casing 22. Certain of the details referred to above are not illustrated as not being necessary to an understanding of the same.

The countershaft and its relatively movable associated parts are lubricated by a similar gear pump comprising the gears 39 and 38. The gear 39 is provided with a shroud 83 and a hole 84 leading to a hole 85 in the center of the countershaft 27 from which suitable branch ducts lead oil to the clutches 41 and 42.

Suitable provision has been made for preventing oil from flowing or being thrown upon the surfaces of the friction material 9. As shown in Fig. 1, the hub 32 is provided with outwardly flaring flanges 87 which throw oil toward the fly wheel 1 or the disc 12, as the case may be. The hub 23 of the disc 11 is similarly provided with flanges 87, the rearward of which throws sufficient oil to lubricate the cam and lever mechanism for controlling the clutch mechanism.

The forward flanges on the hub 23 throw oil toward the disc 12, which is provided with inwardly flaring flanges 88 on both sides for collecting oil received from the discs 11 and 13. A radial hole 89 in the disc 12 connected to the annular grooves formed by the flanges 88 permits the discharge of the oil thus collected. An inclined hole 90 in the fly wheel 1 discharges oil collected in the annular groove 91 adjacent the disc 13.

The clearance between the clutch discs 11, 12 and 13 and the faces of the coacting plates when they are disengaged is very small, being about .018 inch. The separation of each pair of plates is, therefore, about .036 inch. Special means are provided for insuring the accurate centering of the disc 13 when it is disengaged.

The disc 13 is provided at equally spaced intervals with three centering units, each comprising a cup 93 and a steel ball 94, the balls being thrown outward by centrifugal force to engage inclined surfaces of the fly-wheel 1 and plate 6. The centering of the balls 94 insures the centering of the disc 13 with no frictional engagement with either of the adjacent friction surfaces when the latter are separated.

It may be desirable at times to operate for considerable periods in either low or second gear or to permit the car to coast disconnected from the engine. The arrangement shown in Fig. 7 has been provided for rendering it unnecessary to hold the clutch pedal forward by the foot during such periods.

The clutch pedal 19 is adjustably connected by a link 95 to a pivoted arm 96. Adjacent to the outer end of the arm 96 is a slidable block 97 having a series of notches or steps 98. The block 97 is controlled by a bell-crank lever 99 and a rod 100, having a knob 101 thereon that is accessible to the driver.

In operating the arrangement described above, the clutch pedal may be operated from its rearmost position, as shown, to that corresponding to second gear, the knob 101 is then pushed forward and the first step of the block 97 engages the arm 96 to prevent the return of the clutch pedal and the latter may be released by the foot of the driver.

In a similar manner, the clutch pedal may be locked in position for low gear or for neutral. Normal operation of the clutch pedal is restored at any time by pulling the knob 101 to return the block 97 to the position shown out of the path of movement of the arm 96.

The transmission mechanism of my invention operates to shift the speed ratio between the engine and the vehicle silently and without shock or jar. There is a gradual transition from one connection to the other without any overlapping but with substantial continuity.

There is no lost motion in the shift in connections since in the change from low to second gear, the overrunning clutch 42 is already engaged and in the change to high gear a direct connection is established.

While the shift from low gear to high and vice versa is a progressive one in that it must include second gear, this feature is an advantage. The change is not delayed since the movement of the clutch pedal may be continuous if desired and the temporary operation in second gear simply causes a smooth transition from the one speed ratio to the other.

A distinct and novel feature of my invention is the fact that the supply of fuel to the engine need not be interrupted during the shift in driving connections, as is necessary with substantially all transmissions now in general use. Furthermore, the several shifts may be made at speeds that are impossible as well as highly dangerous to attempt with the ordinary transmission having shiftable gears.

As an example of what may be accomplished with my transmission in the way of accelerating a vehicle, it may be assumed that the vehicle is stationary and the clutch pedal is pressed forwardly to its neutral position. To start, the pedal is released to low-gear position and the vehicle brought up to about ten miles an hour when the shift is made to second gear.

Second gear is maintained until, for example, the car speed is forty to forty-five miles per hour. When the shift to high gear is made without releasing the accelerator, the car rapidly increases its speed to about fifty to fifty-five miles per hour in the adjustment between the high engine speed and the car speed.

In the same period of time, the usual car of equal power could not be accelerated to more than thirty to thirty-five miles per hour because of the necessity for shifting gears at relatively low speeds and for interrupting the supply of fuel during the shifts. It is well known that acceleration is most rapid at low and second gears until the upper limits for those speed ratios are approached.

While I have shown my improved transmission mechanism as adapted for three forward speeds and reverse, it may be adapted for four forward speeds by suitably modifying the gear mechanism and providing additional clutch members and their connections.

The foregoing and other advantages will be apparent to those skilled in the art of transmission mechanisms.

I claim as my invention:

1. Transmission mechanism comprising a plurality of clutch discs, a plurality of coacting clutch plates coaxial with said discs, springs for pressing said plates into engagement with said discs, a rotatable cam member having polygonal sides movable axially of said discs and said plates, and means comprising levers connected to each of said plates and coacting with the sides of said movable cam member to selectively determine the engagement of said plates with one, two or more of said discs according to the position of said movable member.

2. Transmission mechanism comprising a plurality of clutch discs, a plurality of coacting clutch plates coaxial with said discs, springs for pressing said plates into engagement with said discs, an annular cam member rotatable with said plates and movable axially thereof, and mechanism comprising a series of levers and pull bolts connected thereto for connecting said annular member to each of said plates and actuated by said annular member to selectively determine the number of discs engaged by said plates in accordance with the axial position of said annular member.

3. Transmission mechanism comprising a series of clutch plates connected for rotation together but relatively movable axially, a series of clutch discs alternating therewith, springs for pressing said plates into engagement with said discs, a polygonal cam member movable axially of said plates and rotatable therewith, a series of levers connected to each of said plates and coacting with the sides of said cam member to successively control the positions of said plates and their engagement of said discs, and means for controlling the position of said cam member.

4. Transmission mechanism comprising a series of clutch plates connected for rotation together but relatively movable axially, a series of clutch discs alternating therewith, springs for pressing said plates into engagement with said discs, a polygonal cam member movable axially of said plates and rotatable therewith, a series of levers connected to each of said plates and coacting with said cam member to successively control the positions of said plates and their engagement of said discs, a lever connected to each plate coacting with each side of said polygonal cam member and said levers being symmetrically disposed with respect to the axis of said cam member.

FERDINAND M. BARTELME.